United States Patent
Wiedemann

(10) Patent No.: US 6,722,279 B2
(45) Date of Patent: Apr. 20, 2004

(54) DEVICE AND CORRESPONDING METHOD FOR RAPID IMAGE DATA TRANSFER IN PRINTING PRESSES

(75) Inventor: Andreas Wiedemann, Sandhausen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/310,929

(22) Filed: Dec. 5, 2002

(65) Prior Publication Data

US 2003/0101887 A1 Jun. 5, 2003

Related U.S. Application Data

(60) Provisional application No. 60/338,173, filed on Dec. 5, 2001.

(30) Foreign Application Priority Data

Dec. 5, 2001 (DE) .......................... 101 59 557

(51) Int. Cl.[7] .......................... B41M 5/00; G06F 13/00
(52) U.S. Cl. .................. 101/463.1; 358/1.15; 358/1.16
(58) Field of Search ............................ 101/485, 248, 101/483, 463.1, 467, 453, 183, 401.1; 347/240, 251, 237, 247; 358/444, 1.15, 1.13, 1.16, 524

(56) References Cited

U.S. PATENT DOCUMENTS

| | | | |
|---|---|---|---|
| 4,495,582 A | * | 1/1985 | Dessert et al. .............. 700/124 |
| 5,323,706 A | * | 6/1994 | Sugawara .................... 700/124 |
| 5,533,453 A | * | 7/1996 | Wolfberg et al. ........... 101/485 |
| 5,868,075 A | * | 2/1999 | Kline et al. ................. 101/467 |
| 5,894,802 A | * | 4/1999 | Jackson ....................... 101/485 |
| 6,029,576 A | | 2/2000 | Fischer et al. .............. 101/485 |
| 6,101,944 A | * | 8/2000 | Schmid et al. .............. 101/467 |
| 6,161,480 A | * | 12/2000 | Pfizenmaier ................. 101/477 |
| 6,222,636 B1 | * | 4/2001 | Gerstenberger ............ 358/1.15 |
| 6,378,431 B1 | * | 4/2002 | Detmers ................... 101/463.1 |
| 6,456,388 B1 | * | 9/2002 | Inoue et al. ............... 358/1.15 |
| 6,507,848 B1 | * | 1/2003 | Crosby et al. .............. 707/102 |
| 6,567,180 B1 | * | 5/2003 | Kageyama et al. ........ 358/1.15 |
| 2001/0024298 A1 | * | 9/2001 | Yoshida ...................... 358/444 |

FOREIGN PATENT DOCUMENTS

EP          0 755 786 A1    1/1997

* cited by examiner

Primary Examiner—Stephen R. Funk
Assistant Examiner—Wasseem H. Hamdan
(74) Attorney, Agent, or Firm—Laurence A. Greenberg; Werner H. Stemer; Ralph E. Locher

(57) ABSTRACT

A device for fast image data transfer in at least one printing press having at least one RIP, includes a data manager to which image data is supplied, at least one storage unit and at least one imaging unit. A bus system is provided for connecting the at least one storage unit both to the at least one data manager for intermediate buffering of the image data, and to the at least one imaging unit for setting an image. The at least one imaging unit serves for communicating with the at least one storage unit, and for reading the image data directly from the at least one storage unit. A method is also provided for operating the device.

11 Claims, 1 Drawing Sheet

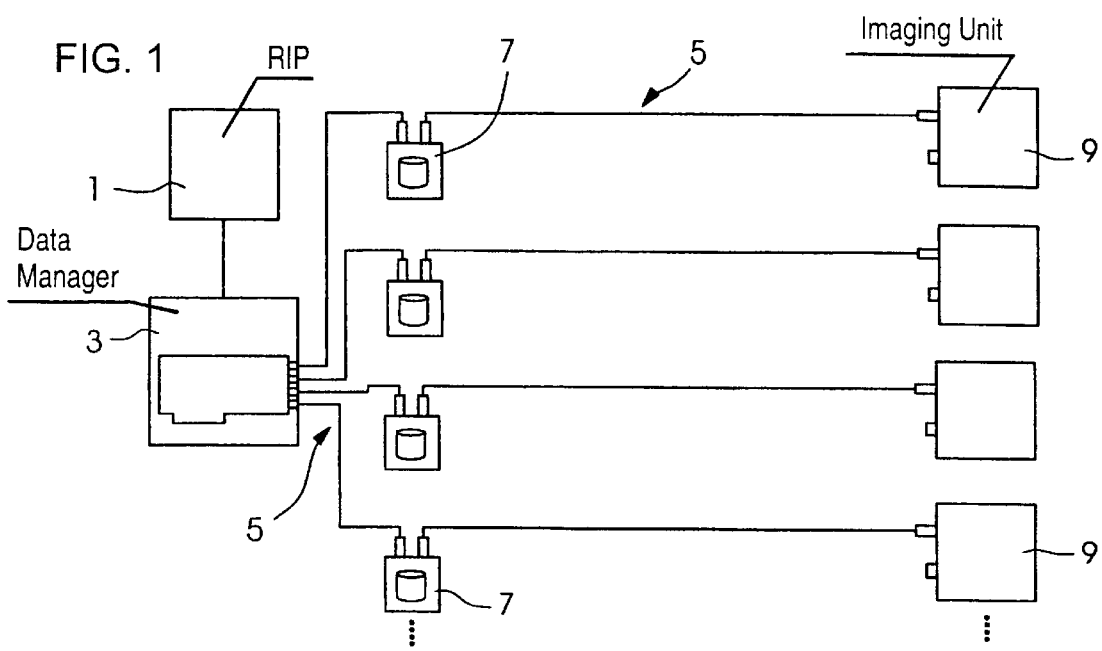
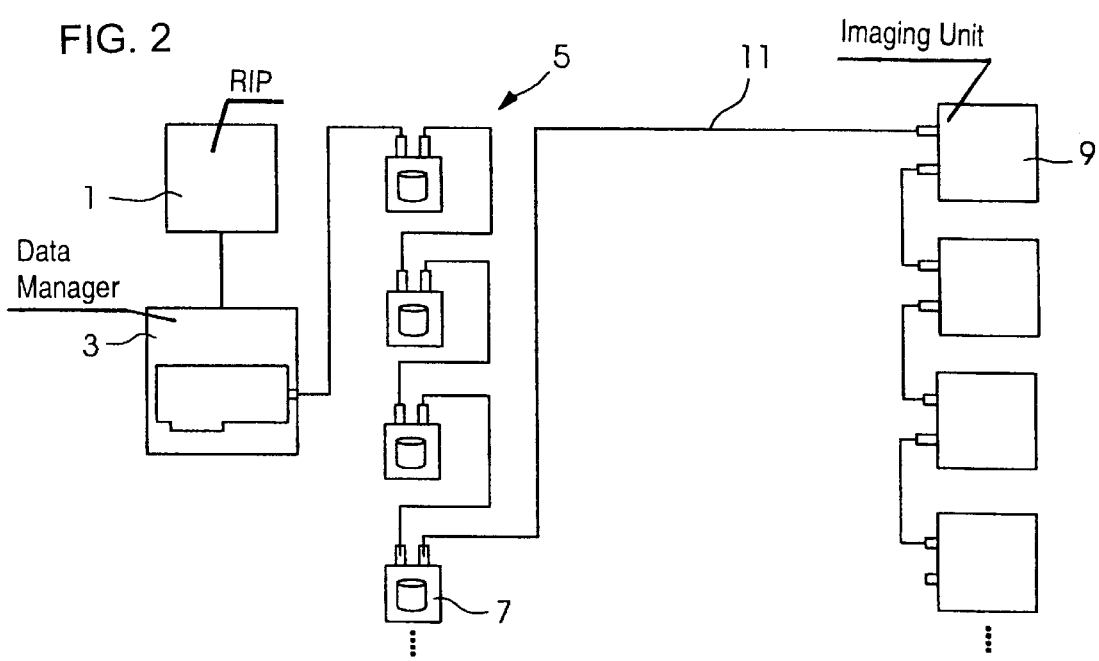
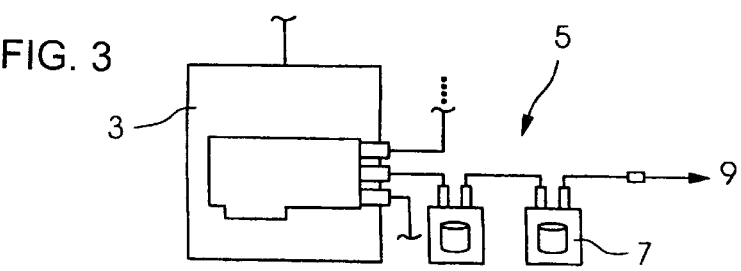

DEVICE AND CORRESPONDING METHOD FOR RAPID IMAGE DATA TRANSFER IN PRINTING PRESSES

This application claims the benefit under 35 U.S.C. § 119(e) of copending provisional application No. 60/338,173, filed Dec. 5, 2001.

BACKGROUND OF THE INVENTION

Field of the Invention

The invention relates to a device and a corresponding method for rapid image data transfer in printing presses.

A device of that general type and a corresponding method are disclosed in U.S. Pat. No. 6,029,576. In that regard, flexible finishing of a printed product is made possible, and an ability to allocate the printing presses used in a print shop is achieved. For that purpose, in the prepress area, there are, amongst others, a computer and two storage units. Image-specific data are stored in the first storage unit of the computer, and printing control-specific image data are stored in the second storage unit. After a concrete job has been allocated to a specific printing press in the print shop, a selection is made from print control-specific image data with which the job can be controlled optimally on the allocated printing press. The mutually associated image-specific and print control-specific image data are then transmitted jointly, via a local network and a bus system, respectively, on which a plurality of imaging systems, that include a raster image processor, hereinafter referred to by the first initials thereof as RIP, a press computer and a printing press erected in the machine room, depend, to an RIP of a corresponding printing press for imaging and control.

Furthermore, European Patent Application EP 0 755 786 A1 discloses a device for controlling a printing press, in particular a sheet-fed offset printing press. The device has a plurality of computers with memories. The individual computers are connected to one another via a bus system constructed as a network, e.g., a CAN-bus. Via the bus and an interface provided as a special connection, a programming unit coupled therewith can realize the changeover of the computer connected to the bus from a state corresponding to normal press operation into a programming state.

Furthermore, it is generally known that, in digital printing presses, during the imaging operation, the separation data previously generated by the RIP are transmitted to the laser imaging units. In order to be able to prevent the imaging from being terminated, a data transfer with a continuous data rate matched to the respective imaging speed and system configuration is required. Consequently, in the case of digital printing presses, the requirement for the overall data rate increases with an increasing number of printing units, because there is an image-setting or imaging unit in each printing unit. Since the RIP according to the state of the prior art is generally incapable of making the required overall data rate available during the imaging, intermediate storage of the separation data is required. Thus, the data is initially copied from the RIP to one or more intermediate memories and then read from the intermediate memories at the required data rate during the imaging. A significant feature of a universal imaging system, in this regard, is being easy to scale. The system must accordingly be suitable for meeting the respective requirements relating to smaller and larger press configurations to the same extent.

In imagesetting or imaging systems which are presently available, hard disks are used as storage media for buffering the separation data. Since hard disks are sensitive to shocks, they are integrated into a separate storage unit in a switch cabinet and not within the printing press. Therefore, no direct access from the imaging unit to the hard disks is possible. The provision of a special storage unit, which is capable of supplying up to six imaging units with image data, has become known heretofore. On the input side, that unit has an SCSI interface, via which the separation data is transmitted to the storage unit. On the output side, there are six proprietary optical bus systems for transmitting the data to the imaging units. The internal electronics are processor-based and are able to drive up to six hard disks, which can be fitted as desired. A disadvantage of that configuration is that it is difficult to scale with regard to costs and performance. That is because the configuration is optimal only in the case of presses having exactly six or exactly twelve printing units. For the case of a configuration deviating therefrom, components are in the system which are not required with respect to performance, and result in unnecessary costs. Since the imaging units have no direct access to the hard disks, a further computer system is always additionally required for assuming the management of the hard disks and the data transfer to the imaging units.

A further approach to a better scaled printing system is by providing a computer system with a hard disk for each printing unit. The connection of the RIP to the computer systems is realized or implemented via an Ethernet interface, and each imaging unit is connected individually to the appertaining computer system via a serial bus line. In that regard, the computer system and the PC respectively send the imaging data to the respective printing unit. Although that modified embodiment meets the requirements with regard to scalability, that advantage is opposed by relatively high costs for the requisite computer systems.

SUMMARY OF THE INVENTION

It is accordingly an object of the invention to provide a device and a corresponding method for fast image transfer in printing presses, which overcome the hereinafore-mentioned disadvantages of the heretofore-known devices and methods of this general type and with which it is possible for an intermediate storage of the image data to be scaled easily with regard to costs and performance.

With the foregoing and other objects in view, there is provided, in accordance with the invention, a device for fast image data transfer in at least one printing press having at least one RIP. The image data transfer device includes a data manager to which image data is supplied, at least one storage unit and at least one imaging unit. A bus system is provided for connecting the at least one storage unit both to the at least one data manager for intermediate buffering of the image data, and to the at least one imaging unit for setting an image. The at least one imaging unit serves for communicating with the at least one storage unit, and for reading the image data directly from the at least one storage unit.

In accordance with another feature of the invention, the at least one imaging unit includes at least two imaging units serially connected to one another and to the at least one storage unit by the bus system.

In accordance with a further feature of the invention, the at least one imaging unit includes at least two imaging units connected via the bus system to the one storage unit, and jointly accessible thereto via the bus system.

In accordance with an added feature of the invention, the bus system includes a plurality of data lines. A plurality of the imaging units are connected to a plurality of the storage units via only one individual data line of the bus system.

In accordance with an additional feature of the invention, the at least one imaging unit is capable of reading the image data directly from the at least one storage unit via the bus system.

In accordance with yet another feature of the invention, the at least one data manager is capable of writing the image data into more than the one storage unit via the bus system.

In accordance with yet a further feature of the invention, the at least one data manager is capable of writing the image data into all of the storage units via the bus system.

In accordance with yet an added feature of the invention, the components of the image data transfer device are capable of utilizing at least one of the groups consisting of different transmission media and standards of the bus system.

In accordance with yet an additional feature of the invention, the at least one storage unit includes at least two storage units assigned to one imaging unit.

In accordance with still another feature of the invention, the at least one data manager serves for defining an assignment of the at least one storage unit to the at least one imaging unit and for writing appropriate image data into the respectively defined storage unit.

With the objects of the invention in view, there is also provided a method for fast image data transfer in printing presses. The method includes using at least one data manager for writing image data obtained from at least one RIP via a bus system into at least one storage unit for intermediate buffering of the image data. At least one imaging unit connected to the at least one storage unit communicates via the bus system with the at least one storage unit. The image data, which is stored in the at least one storage unit, is directly read for setting an image.

Through the use of the foregoing construction of the device according to the invention, a system architecture which can be scaled easily with regard to costs and performance is provided, that affords intermediate buffering of the image and separation data, respectively, for an imaging system for digital printing presses and CTP systems. The invention is based on storage media which use the same bus interface as the imaging units and to which all the bus subscribers are accessible via this bus system. Accordingly, both the computer designated as the data manager and the respective imaging units are accessible to these storage media via one and the same bus system. Before setting an image, the data manager copies the separation data received from the RIP to the respective storage medium. During the imaging, the data is read from the storage medium again by the imaging units. As a result, the imaging units are directly accessible to the storage media without having to take the circuitous route via a further computer system. Within the imaging system, there is only one bus system, via which the separation data is both written and read.

Provision is advantageously made, if possible, for all of the imaging units to be connected to the storage units via only a single individual data line of the bus system. This construction is particularly cost-effective and, in addition, offers the advantage that there is no fixed association between the printing units and the storage units. Thus, even shortly before the imaging operation, a change in the data assignment is possible without recopying the respective image and printing data. The system and, in particular, the individual data line, in this regard, must be suitable for the correspondingly high data rates which occur.

According to a preferred embodiment, at least two storage units are assigned to one imaging unit. In this regard, the higher data throughput of the overall configuration as compared with a configuration having only one hard disk per imaging unit is advantageous. In addition, subsequent expansion of the storage capacity of the system is facilitated in this embodiment. Furthermore, the fail safety of the system is increased by storage units which, from time to time, are redundant.

In order to be able to adapt the configuration optimally to the respective requirements with regard to performance and costs, provision can be made for the components to be connected to one another via a common bus system but to make use of different respective transmission media and standards of a bus system (e.g. copper cable, glass fiber). Provision can also be made for obtaining access to the storage unit on the data manager side and on the imaging side via different bus systems.

Other features which are considered as characteristic for the invention are set forth in the appended claims.

Although the invention is illustrated and described herein as embodied in a device and a corresponding method for fast image data transfer in printing presses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a greatly simplified, basic diagrammatic and schematic illustration of a first exemplary embodiment of the device according to the invention for rapid image data transfer in a printing press;

FIG. 2 is an illustration similar to that of FIG. 1 of a second exemplary embodiment of the device; and FIG. 3 is a fragmentary view of a third exemplary embodiment of the device according to the invention.

DESCRIPTION OF THE PREFERRED EMBODIMENTS

Referring now to the figures of the drawings in detail and first, particularly, to FIG. 1 thereof, there is seen a first exemplary embodiment of the device according to the invention, which includes a raster image processor or RIP 1 connected to a data manager 3. The RIP 1 receives image/separation data from non-illustrated computers of a prepress region. Since the RIP 1 is not involved in the actual imagesetting or imaging operation, due to intermediate buffering of the image data explained hereinbelow, no special requirements with respect to architecture are imposed upon the RIP 1. The data manager 3 is connected in parallel with a multiplicity of storage units 7, four of which are shown in FIG. 1, via a bus system 5. The image data are not stored in the data manager 3, but rather, outside the data manager, in the storage units 7. The data manager 3 has an adequate number of bus streams for the respective press configuration which, in particular, is determined by the number of printing units. The bus streams are suitable for the data rate required for the imaging. In addition, the data manager 3 is available via a suitable interface to the RIP 1. The performance of the data manager 3 influences the overall performance of the printing configuration to such an extent that all of the image data are transferred to the storage units 7 (downloaded) via the data manager 3 before the imaging. Therefore, a personal computer or an industrial PC serves as the data manager 3. Each storage unit 7 is respectively connected via a line of the bus system 5 to precisely one printing unit and one imaging unit 9, respectively. On the printing-unit side, a system is therefore required which provides a corresponding bus connection with the required data rate. In this regard, data rates of up to 20 megabytes are required in order to carry out the print jobs. In addition, the imaging unit 9 must be capable of communicating with the corresponding storage unit 7 via a protocol. The data manager 3 is therefore not tied into the printing data transmission during the imaging. During the imaging operation, the imaging units 9 become directly accessible to the storage media 7 connected thereto. The maximum achievable imaging rate, in contrast with the download operation, therefore does not depend upon the performance of the data manager 3. The system is, in principle, scalable as desired by adding further storage media 7 and imaging units 9 to the bus system 5. Virtually independent of the number thereof, only one data manager 3 is required for the management and distribution of the printing data to the storage units 7.

The printing configuration according to FIG. 1 is based upon a serial bus system, which is defined in the IEEE1394 standard and is also known by the term Firewire. For this bus system 5, suitable hard disks are available as the storage unit 7, and can be connected directly to the bus system. These disks are standard IDE or SCSI hard disks, which are available via an appropriate converter. Furthermore, any desired hard disks can be used, provided that a suitable converter is available on the bus system that is used. Alternatively, in principle, use could be made of a USB2.0 system, for which there are likewise provided storage media with a direct bus connection, however, the restricted cable length thereof renders the use thereof in printing presses much more difficult. In addition, the fiber channel known from the professional PC sector could be used, likewise offering hard disks with a direct bus connection. The storage medium must be capable of storing large amounts of storage data (at least several GByte), in order to be able to keep in parallel a plurality of print jobs in reserve. In addition, the printing data must be capable of being read at the required data rate during the imaging operation. The hard disks are located outside the printing press in a separate non-illustrated switch cabinet. The imaging units 9 of the printing press can access the hard drives directly via the bus system 5. The computer required for controlling the printing unit is not illustrated in FIG. 1.

In a non-illustrated enlarged system having a plurality of printing presses, a plurality of RIPs 1 and a plurality of data managers 3, respectively, could be provided in order to improve performance, all thereof being connected to one another via one network or via, for example, two partial networks. The advantage of a plurality of RIPs is that, when a plurality of printing presses are present, a plurality of print jobs can be scanned in parallel, and therefore a higher throughput of jobs is possible. For example, in the case of a 10-color printing press, one print manager could be provided for every five printing units.

According to the second exemplary embodiment shown in FIG. 2, increased performance of the bus system 5 and lower requirements prescribed for the imaging units, respectively, are assumed. It is thereby possible to connect a number of storage units 7 to a number of imaging units 9 via an individual data line 11 of the bus system 5. The assignment of the storage units 7 to the printing units and the imaging units 9, respectively, is not rigidly determined, but rather, the data manager 3 defines this assignment flexibly, job by job, in a suitable manner depending upon the print job or print jobs which are outstanding. The number of imaging units 9 can therefore differ from the number of storage units 7. If the storage units 7 provide an adequate data rate, a plurality of imaging units 9 can provide access to one of the member units 7 during the imaging operation.

In a third exemplary embodiment of FIG. 3, which may be constructed in principle like the configuration according to the first or the second exemplary embodiment, or a suitable mixed form, a computer-to-plate or ctp system is shown as a detail. In this regard, it is typical, in particular, that images are continually set without relatively long pauses. The download time, i.e., the time for copying the image data to the storage unit 7, is particularly critical. Therefore, according to FIG. 3, two storage units 7 are provided for each imaging unit 9. While images are being set from one of the storage units, new separation data can be written to the other storage unit simultaneously as required by the data manager 3. In addition, the fail-safety of this printing configuration can be increased due to the storage units which may possibly be redundant during specific print jobs.

I claim:

1. A device for fast image data transfer in at least one printing press having at least one RIP, the image data transfer device comprising:

a data manager receiving image data;

at least one storage unit;

at least one imaging unit; and a bus system for connecting said at least one storage unit both to said at least one data manager for intermediate buffering of the image data and to said at least one imaging unit for setting an image;

said at least one imaging unit communicating with said at least one storage unit and reading the image data directly from said at least one storage unit.

2. The image data transfer device according to claim 1, wherein said at least one imaging unit includes at least two imaging units serially connected to one another and to said at least one storage unit by said bus system.

3. The image data transfer device according to claim 1, wherein said at least one imaging unit includes at least two imaging units connected via said bus system to said one storage unit, and jointly accessible thereto via said bus system.

4. The image data transfer device according to claim 1, wherein said bus system includes a plurality of data lines, and a plurality of said imaging units are connected to a plurality of said storage units via only one individual data line of said bus system.

5. The image data transfer device according to claim 1, wherein said at least one imaging unit is capable of reading the image data directly from said at least one storage unit via said bus system.

6. The image data transfer device according to claim 1, wherein said at least one data manager is capable of writing the image data into more than said one storage unit via said bus system.

7. The image data transfer device according to claim 6, wherein said at least one data manager is capable of writing the image data into all of said storage units via said bus system.

8. The image data transfer device according to claim 1, which further comprises components for utilizing at least one of different transmission media and standards of said bus system.

9. The image data transfer device according to claim 1, wherein said at least one storage unit includes at least two storage units assigned to one imaging unit.

10. The image data transfer device according to claim 1, wherein said at least one data manager serves for defining an assignment of said at least one storage unit to said at least one imaging unit and for writing appropriate image data into said defined storage unit.

11. A method for fast image data transfer in printing presses, which comprises:

writing image data obtained from at least one RIP, with at least one data manager, via a bus system into at least one storage unit for intermediate buffering of the image data;

communicating, with at least one imaging unit connected to the at least one storage unit, via the bus system, with the at least one storage unit; and directly reading the image data stored in the at least one storage unit, for setting an image.

* * * * *